March 17, 1970  J. F. CULLINANE  3,500,714
APPARATUS FOR LAUNCHING PROJECTILES
Filed Dec. 14, 1967  13 Sheets-Sheet 1
FIG_1
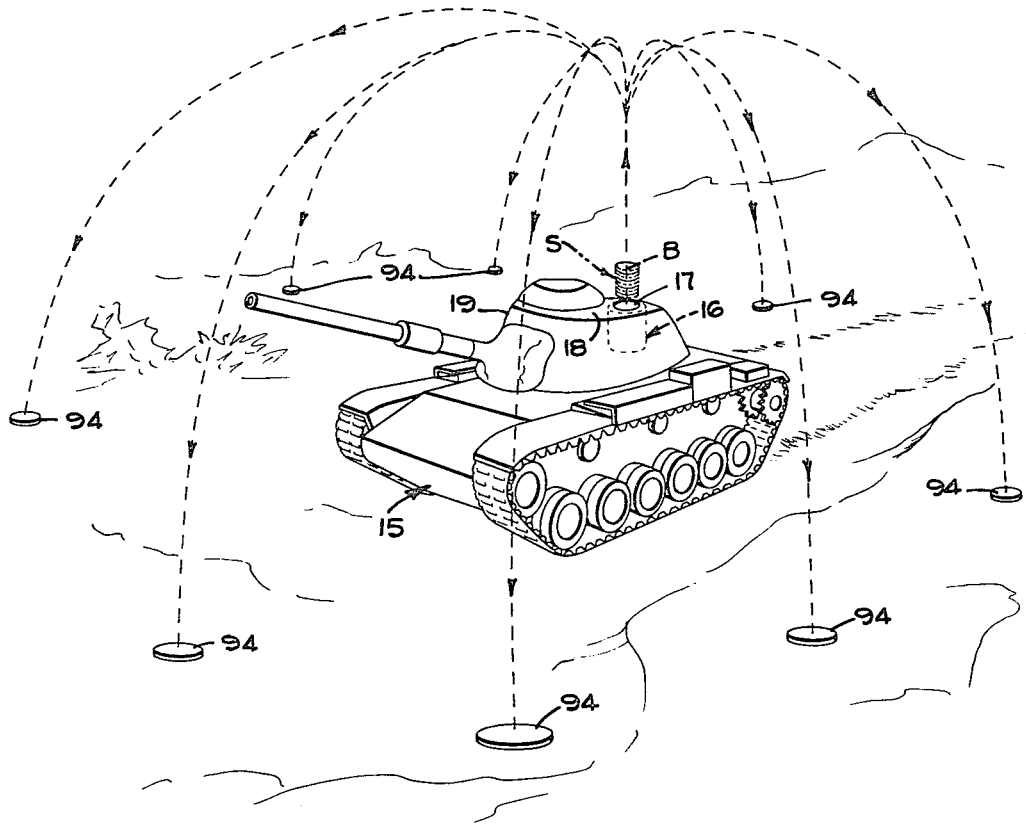
INVENTOR.
JAMES F. CULLINANE
BY F. W. Anderson
C. E. Tripp
ATTORNEYS March 17, 1970 J. F. CULLINANE 3,500,714
APPARATUS FOR LAUNCHING PROJECTILES
Filed Dec. 14, 1967 13 Sheets-Sheet 2
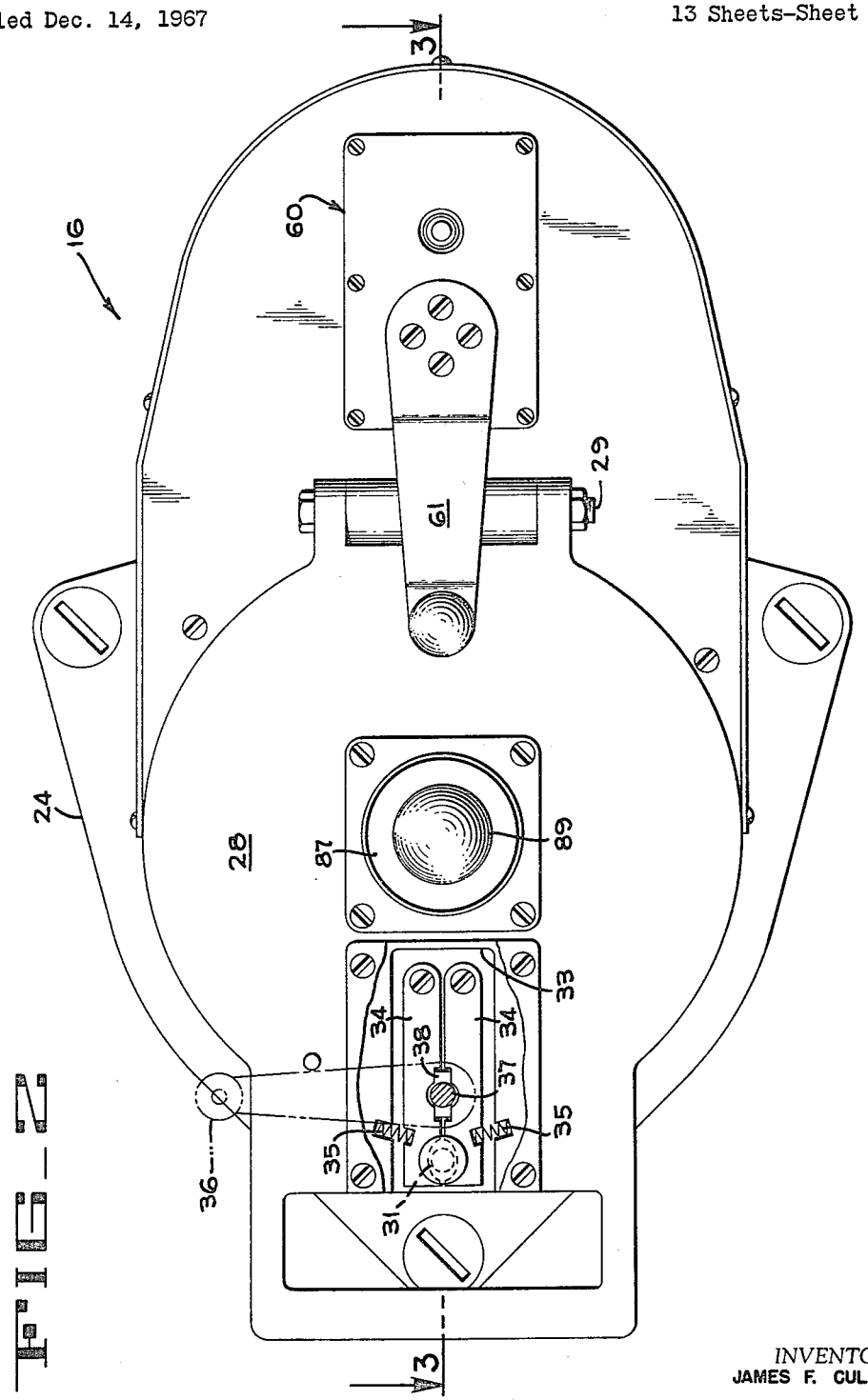
INVENTOR.
JAMES F. CULLINANE
BY F.W. Anderson
C.E. Tripp
ATTORNEYS March 17, 1970  J. F. CULLINANE  3,500,714
APPARATUS FOR LAUNCHING PROJECTILES
Filed Dec. 14, 1967  13 Sheets-Sheet 3
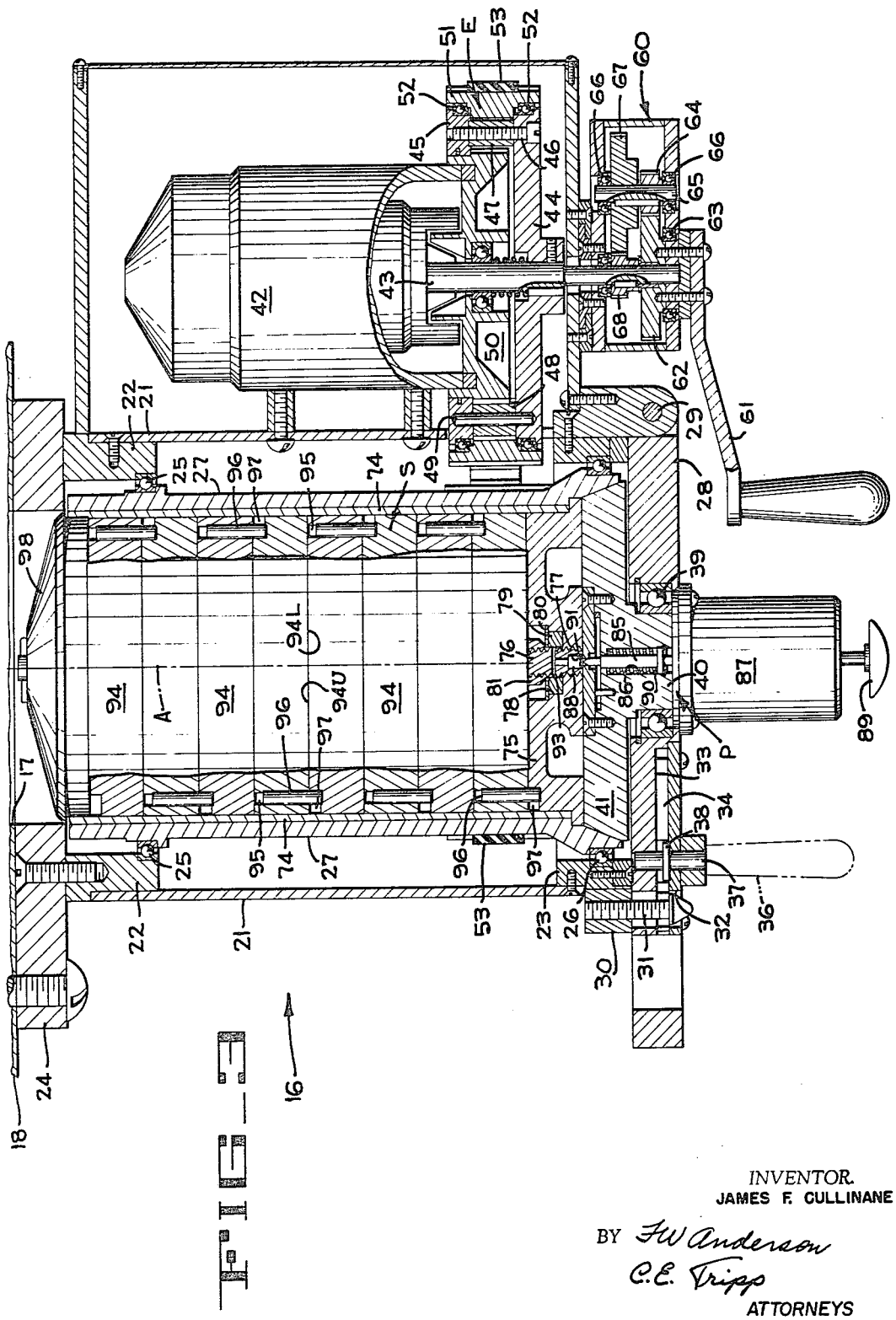
INVENTOR.
JAMES F. CULLINANE
BY F.W. Anderson
C.E. Tripp
ATTORNEYS

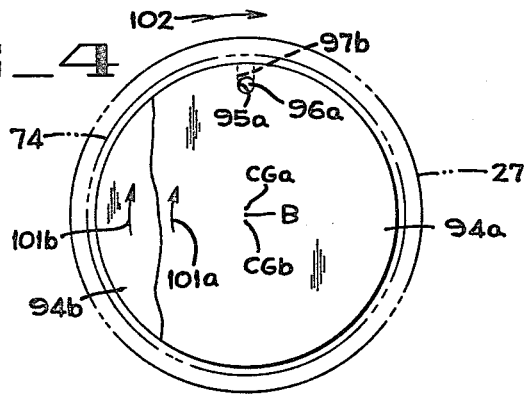
FIG_4
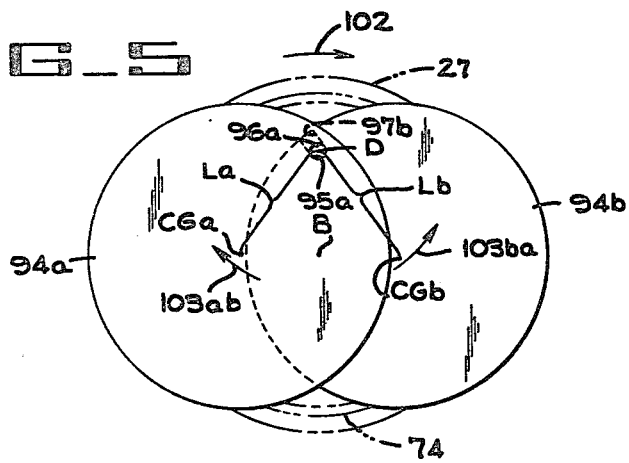
FIG_5
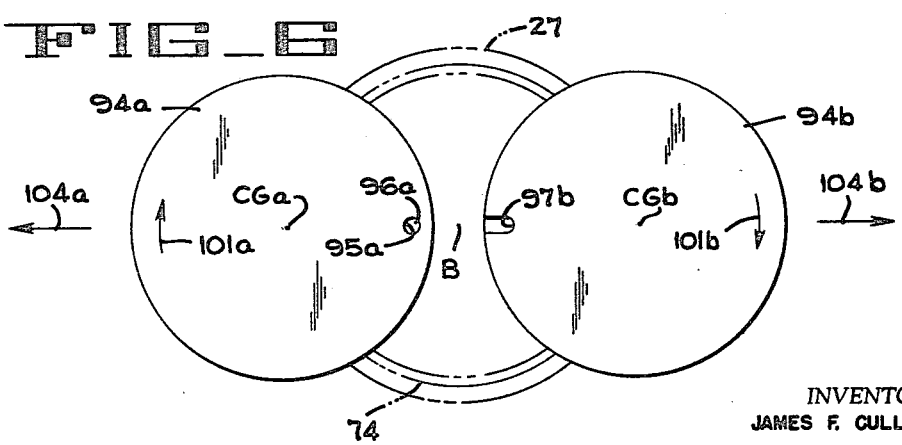
FIG_6
INVENTOR.
JAMES F. CULLINANE
BY *FW Anderson*
*C.E. Tripp*
ATTORNEYS

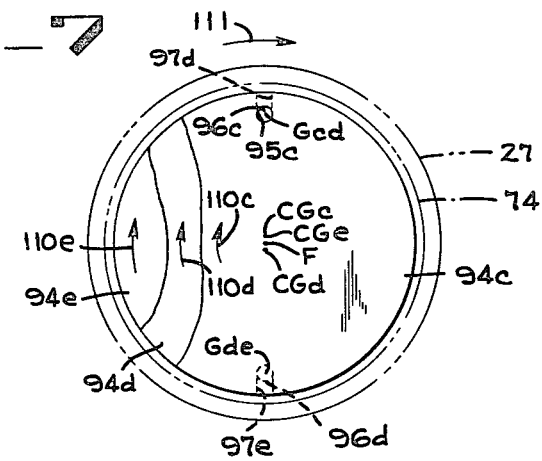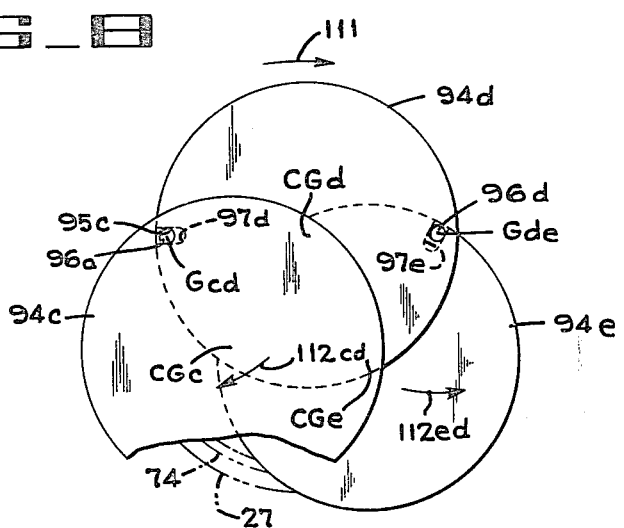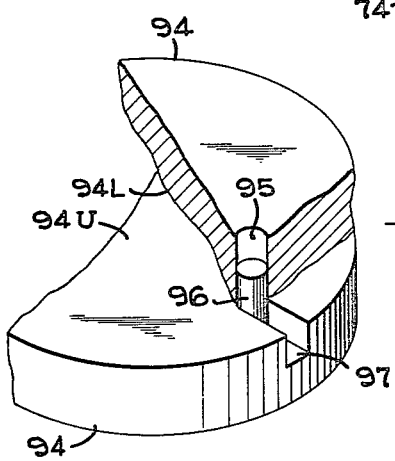

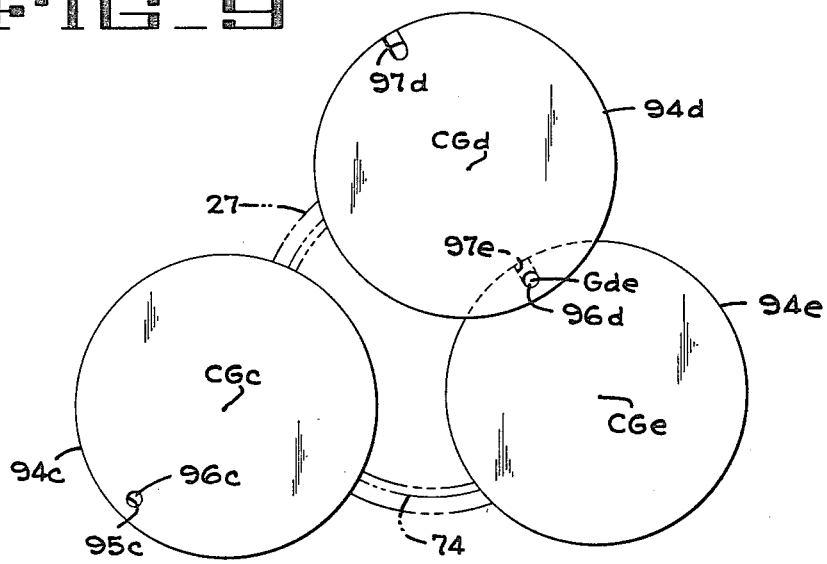
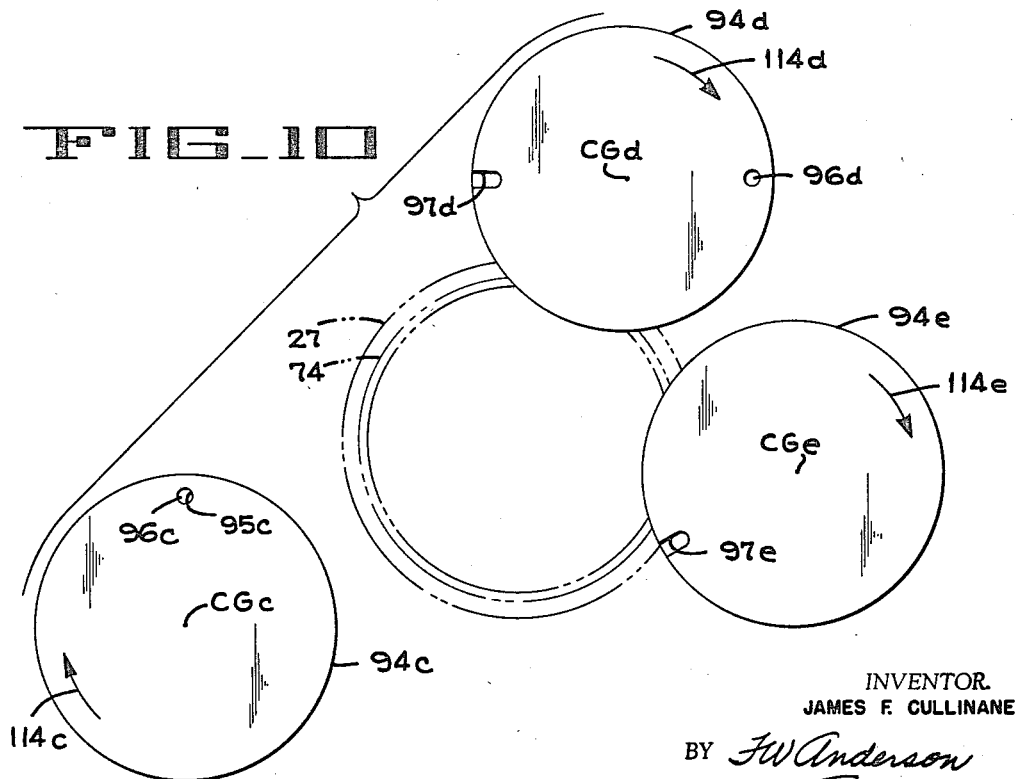

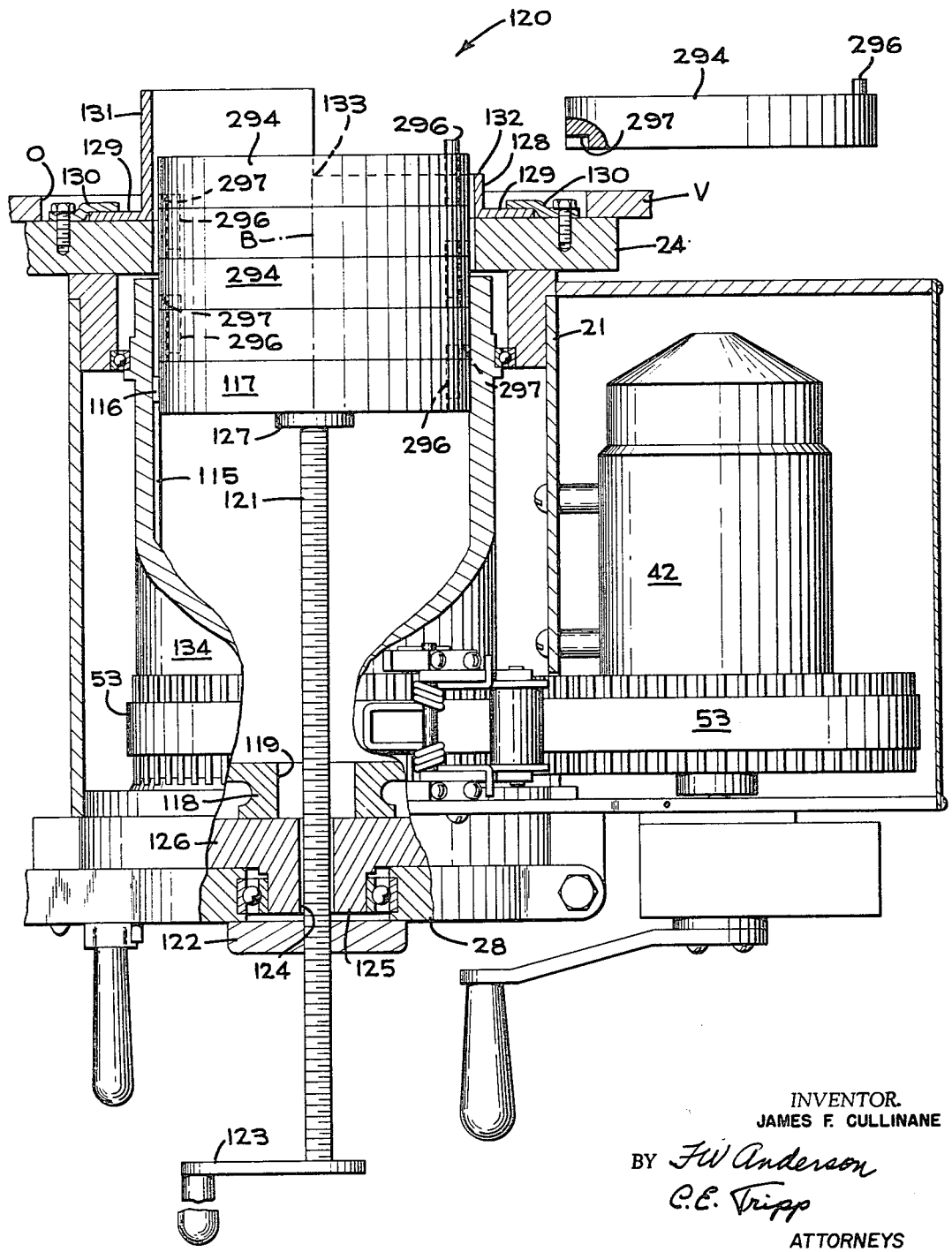

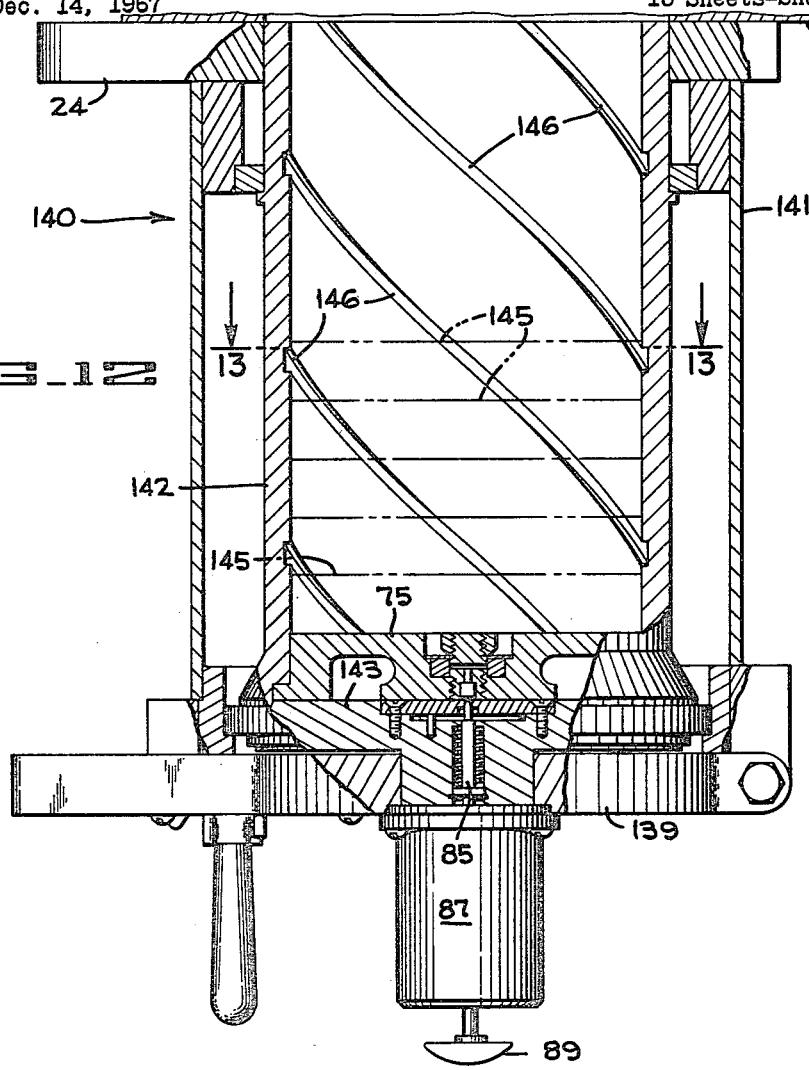
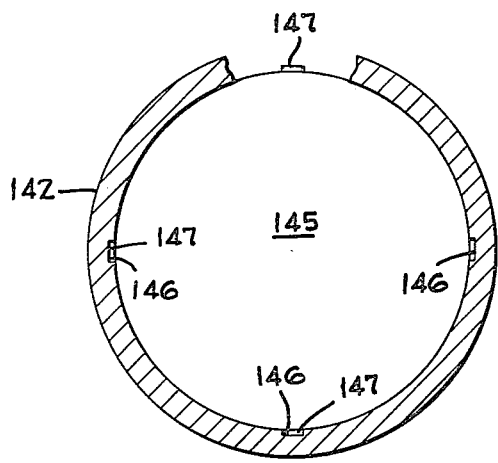
INVENTOR.
JAMES F. CULLINANE
BY F.W. Anderson
C.E. Tripp
ATTORNEYS

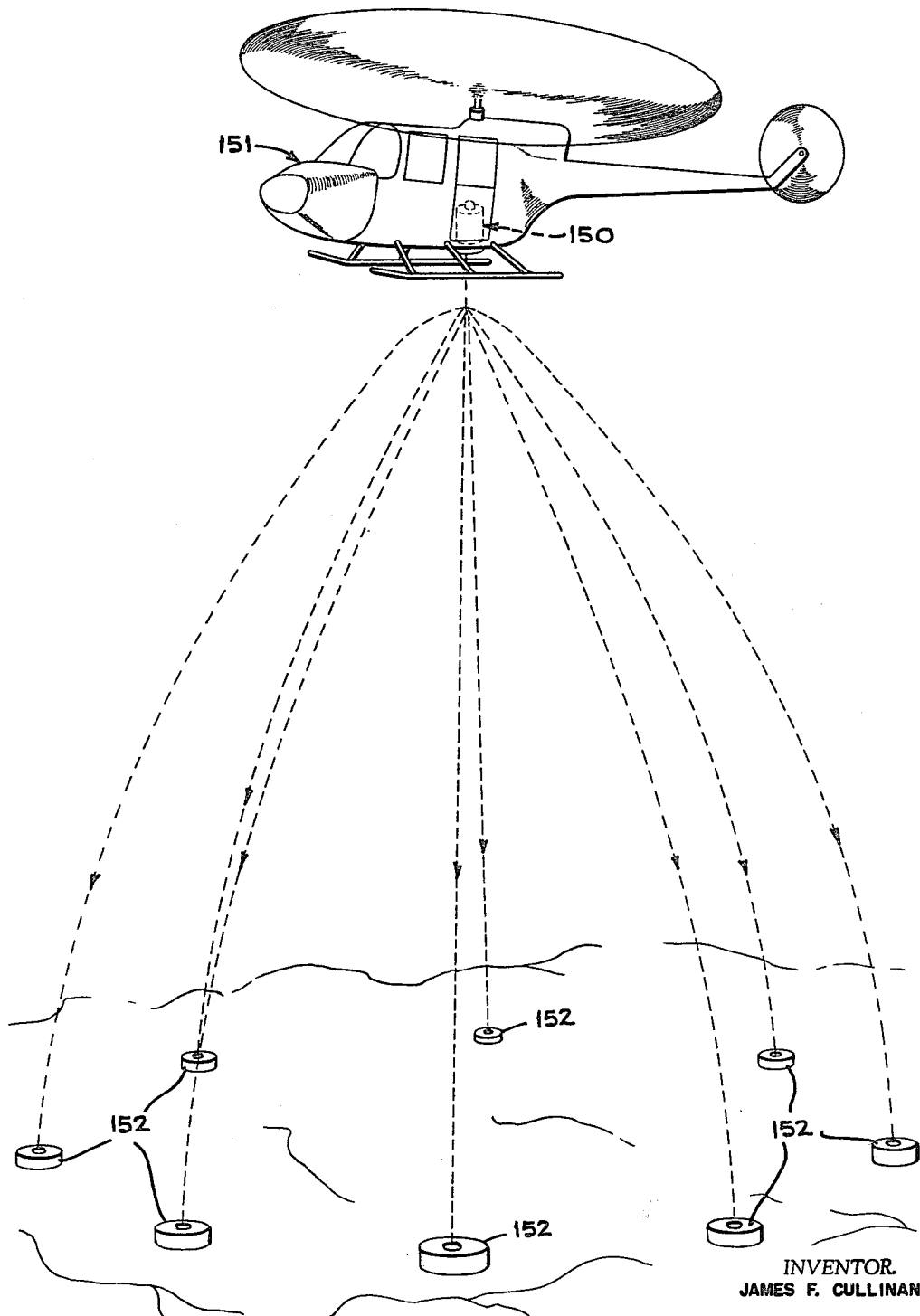
FIG_14

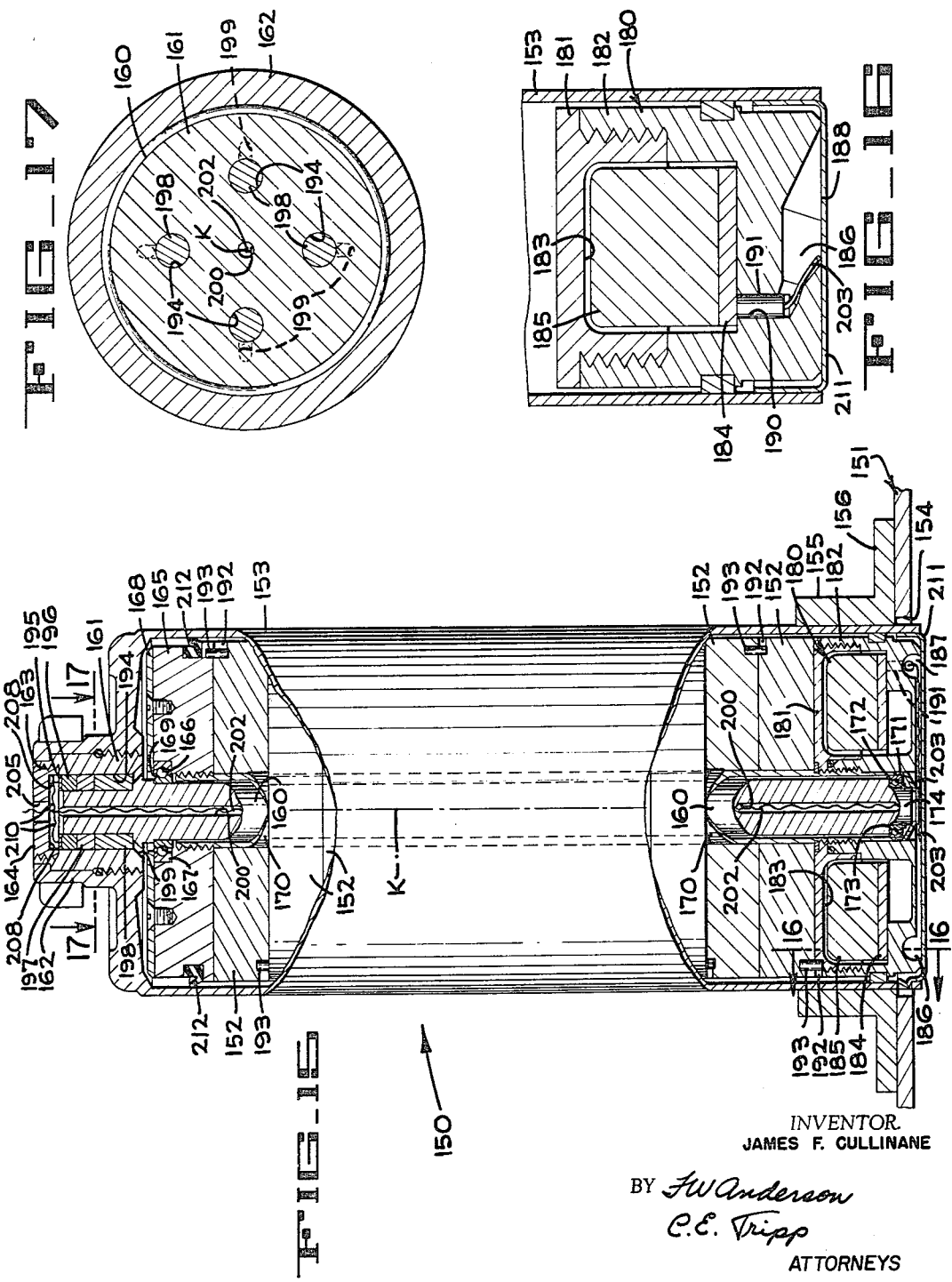

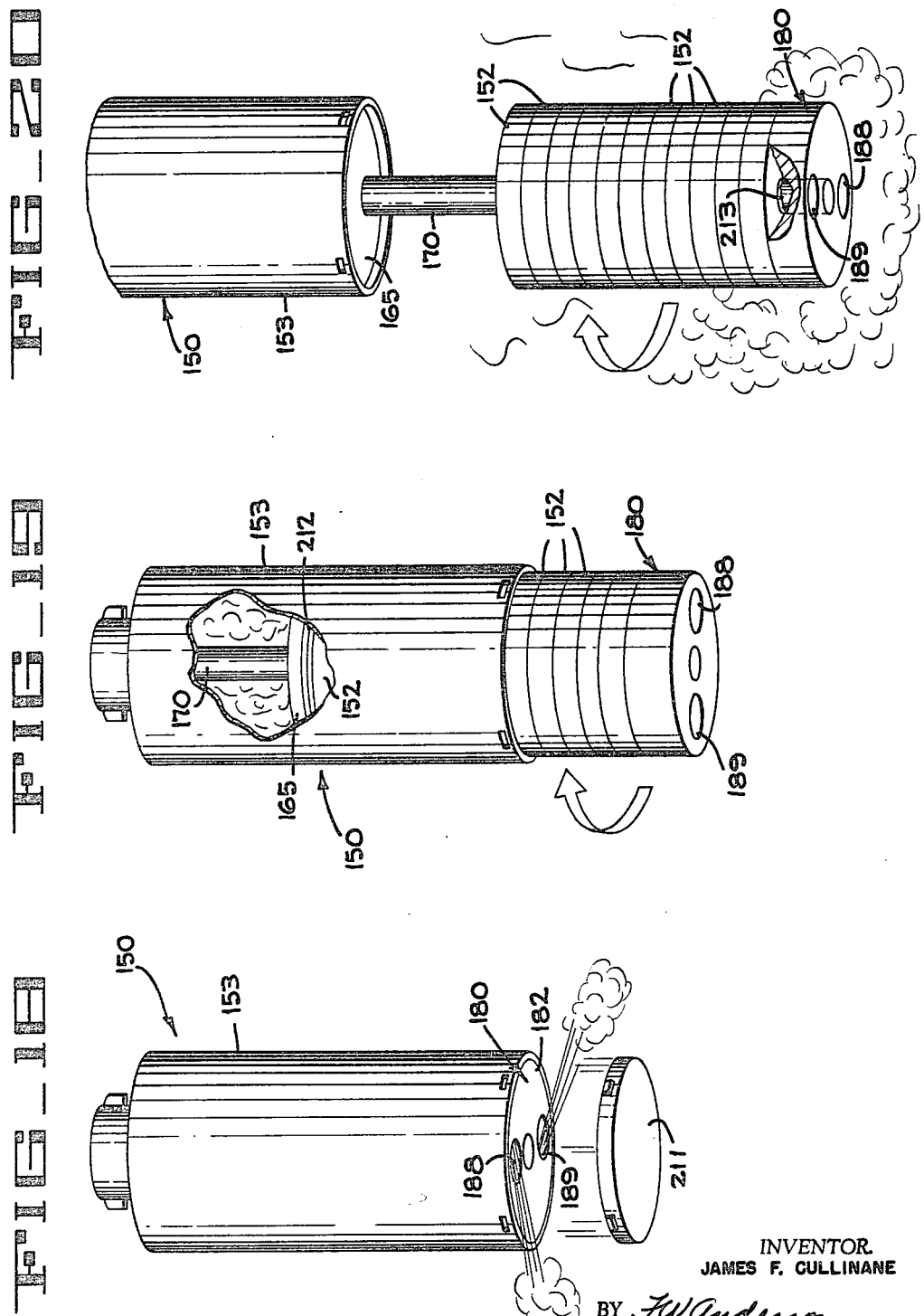

March 17, 1970 J. F. CULLINANE 3,500,714
APPARATUS FOR LAUNCHING PROJECTILES
Filed Dec. 14, 1967 13 Sheets-Sheet 12
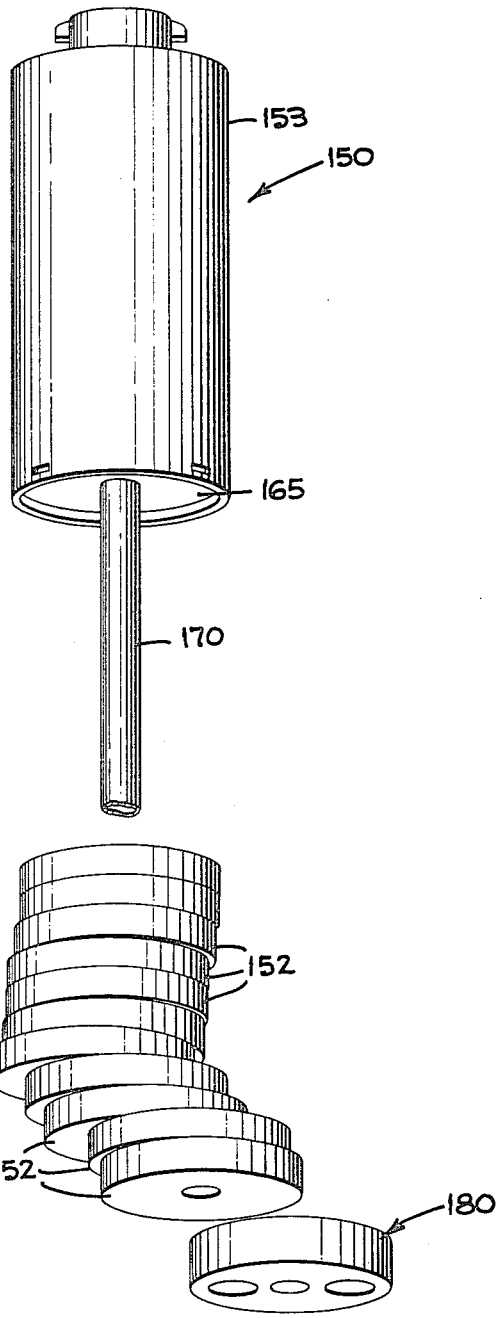
INVENTOR.
JAMES F. CULLINANE
BY J.W. Anderson
C.C. Tripp
ATTORNEYS March 17, 1970   J. F. CULLINANE   3,500,714
APPARATUS FOR LAUNCHING PROJECTILES
Filed Dec. 14, 1967   13 Sheets-Sheet 13
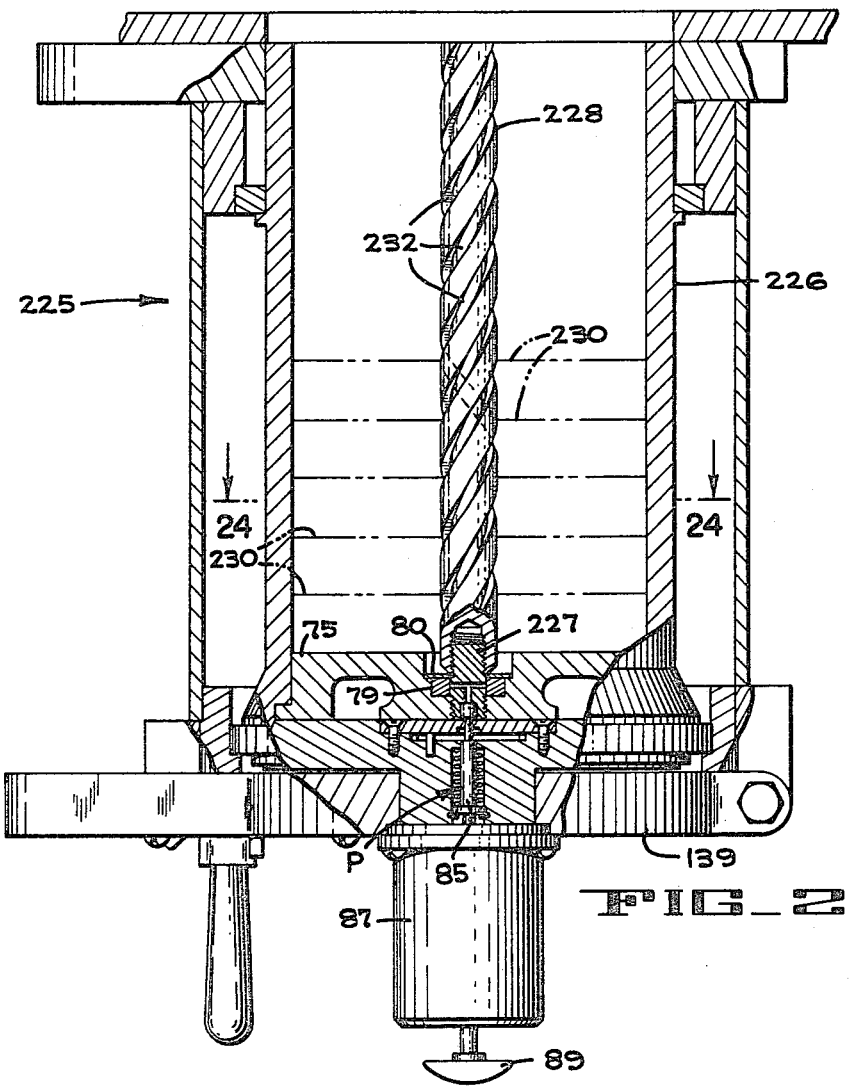
FIG_23
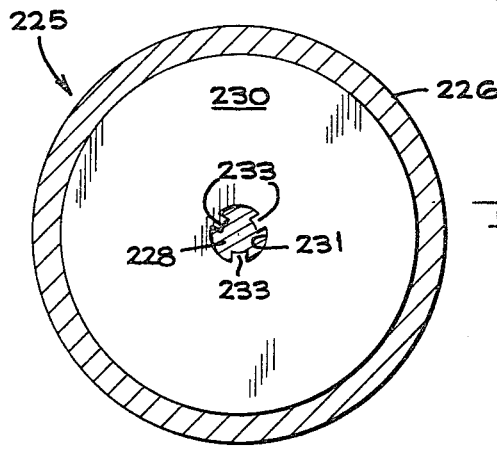
FIG_24
INVENTOR.
JAMES F. CULLINANE
BY F.W. Anderson
C. E. Tripp
ATTORNEYS

United States Patent Office 3,500,714
Patented Mar. 17, 1970

3,500,714
APPARATUS FOR LAUNCHING PROJECTILES
James F. Cullinane, Saratoga, Calif., assignor to FMC Corporation, San Jose, Calif., a corporation of Delaware
Filed Dec. 14, 1967, Ser. No. 690,595
Int. Cl. F41f 1/00; F41b 3/04
U.S. Cl. 89—1                                    28 Claims

ABSTRACT OF THE DISCLOSURE

A launcher propels projectiles into the air for dispersion. The launcher has a vertical tube which receives a plurality of disc-shaped projectiles comprising anti-personnel munitions. Each projectile has adjacent the edge a vertical pin which is received in a radial edge slot of an adjacent projectile. The tube is spun about its longitudinal axis to spin the projectile discs, and a propulsion unit secured in the base of the tube propels the spinning, releasably engaged projectiles out of the tube. Each projectile, when released from the confines of the tube, swings about the pin by which it is connected to an adjacent projectile, so that all discs separate and fly outwardly from the longitudinal axis of the launcher tube for explosion. Launchers mounted in tanks and planes are disclosed. An arcuate backing plate is disclosed which is mounted on the outer end of the tube to aim the projectile. Projectiles mounted on an axle instead of in a tube are also disclosed. Alternative means disclosed for spinning the discs includes rifling and a spinner motor connected to the discs.

Background of the invention

The present invention relates to apparatus for dispersing projectiles such as anti-personnel munitions.

It is sometimes desirable to disburse projectiles, such as disc-shaped munitions, in an evenly distributed pattern through 360 degrees around a point. The projectiles might, for example, be anti-personnel mines which are to be propelled from a tank or other vehicle, for air or ground explosion, to protect the vehicle from attack by enemy personnel.

One method of launching a plurality of discs to spread out from a point of origin would be to use a separate launching tube for each disc dispersed. The tubes would be pointed in different directions, each aimed in the particular direction the disc to be launched from that tube is to be propelled. This method would require tubes equaling in number the quantity of discs to be dispersed. Another method which might be employed to spread a plurality of discs around a central point would be to spray the discs around in a circle by swinging a single inclined launching tube through 360 degrees. This latter method could not be utilized for a simultaneous dispersion of the discs.

Summary of the invention

In the present invention, a plurality of projectiles can be dispersed simultaneously from a single launching tube in an evenly distributed pattern around the tube. The tube remains pointed in a single direction, and, when used to launch munition projectiles, can easily be concealed from personnel in the target area since it need not be pointed toward the target area. In brief, in the preferred form of the invention, a launcher has a vertical, spinnable launching tube which is loaded with stacked disc-shaped projectiles. Each disc has a coupling, or linking, pin on a coupling axis adjacent the edge which fits into a radial edge slot on an adjacent disc so that all the discs are releasably coupled together inside the tube. The centers of the discs fall on the central vertical axis of the launching tube, and when the tube is spun on that axis, the discs are spun in unison about their centers. A propulsion unit secured in the base of the tube has a charge which blasts the spinning projectiles straight up out of the tube. The center of gravity of each disc is spaced slightly from the axis on which the coupled discs are spinning so that the discs swing about the coupling pins by which they are coupled to adjacent discs and disengage from said discs. The spinning discs, which are gyroscopically stable, on separation from the other discs, fly radially outward from the vertical axis of the launching tube to fall in an evenly distributed pattern extending a full 360 degrees around the axis of the tube. Alternatively, the projectiles can be mounted on an axle instead of in a tube. The projectiles are spun on the axle and propelled therefrom for distribution in a pattern similar to the pattern in which they fall when ejected from the tube.

The present invention can be utilized to distribute projectiles from a stationary or mobile launcher. For example, mines can be propelled out of an advancing vehicle to lay a mine field in a military operation, or smoke canisters can be scattered to conceal a military operation. Projectiles can be dispersed from a plane and propelled outwardly therefrom in a circular pattern.

The launching tube can be mounted, for example, on a tank or other vehicle, a helicopter, or on any other suitable stationary or moving platform. The launching tube need not be vertical but can be directed at any desired angle. The tube not only can be pointed straight up (as in a tank), or straight down (as in a helicopter), but can also be directed horizontally (as an artillery piece) or at any desired angle between the vertical and horizontal (as a mortar tube). The spinning motion may be imparted to the projectiles, such as the discs, before launching or may be imparted to the discs by rifling in the launching tube or on the axle as the discs are propelled therefrom. Alternatively, a spinner motor can be connected to the discs.

Preferably, the projectiles are blasted out of the launching tube, or off the axle, suddenly so that all the projectiles are released from restraint at substantially the same time. In some instances, however, it is desirable to release one projectile at a time. This can be accomplished by advancing the spinning projectiles slowly so that the projectiles are released one at a time from the launching tube. Preferably, a semi-circular backing plate is mounted on the end of the launching tube to guide the outward flight of the projectile.

It is, therefore, one object of the present invention to propel projectiles in a circular array. It is another object of the present invention to scatter projectiles around a single launching tube. It is still another object of the present invention to evenly distribute ammunition discs simultaneously about a point. It is yet another object of the present invention to scatter munitions in a target area from an easily concealed launching tube which is not pointed toward the target area. It is another object of the present invention to scatter munitions outwardly from the axis of a launching tube which may be vertical, horizontal, or at any desired angle therebetween. It is another object of the present invention to propel objects one at a time from a launching tube. It is still another object of the present invention to disperse objects laterally from a launcher.

BRIEF DESCRIPTION OF THE DRAWINGS

FIGURE 1 is a view in perspective of an armored tank incorporating apparatus of the present invention;

FIGURE 2 is a view of the bottom of the launcher mounted in the tank of FIGURE 1;

FIGURE 3 is a view taken on lines 3—3 of FIGURE 2;

FIGURES 4, 5 and 6 are successive views from above of a pair of discs being propelled upwardly from a launcher into free flight showing the discs as they leave the launcher, as they begin to separate, and after they have separated, respectively.

FIGURES 7, 8, 9 and 10 are successive views from above of three discs being propelled upwardly from a launcher into free flight showing the discs as they leave the launcher, as they begin to separate, after one disc has separated from the other two, and after all the discs have separated, respectively;

FIGURE 11 is a cross-sectional view of a modified form of launcher;

FIGURE 12 is a cross-sectional view of yet another modified form of invention;

FIGURE 13 is a view taken on the line 13—13 of FIGURE 12;

FIGURE 14 is a view in perspective of a helicopter incorporating apparatus of the present invention;

FIGURE 15 is a view in cross-section of another modified form of launcher;

FIGURE 16 is a view taken on the line 16—16 of FIGURE 15;

FIGURE 17 is a view taken on the line 17—17 of FIGURE 15;

FIGURES 18, 19, 20 and 21 are successive views of a plurality of discs being launched from the launcher of FIGURE 15 showing the discs inside the launcher casing, partially out of the launcher casing, completely out of the launcher casing, and propelled off the tube into free flight, respectively;

FIGURE 22 is a view in perspective, partly broken away, showing the coupling of two discs;

FIGURE 23 is a cross-sectional view of still another modified form of the invention; and FIGURE 24 is a view taken on line 24—24 of FIGURE 23.

Description of the preferred embodiments

There is shown in FIGURE 1 an armored tank 15 in which a launcher 16 constructed in accordance with the present invention is installed. An opening 17 in the top deck 18 of tank turret 19 permits the passage of projectiles 94 propelled from the launcher 16. As shown in FIGURE 3, the launcher 16 is mounted inside the tank turret in registration with opening 17. The launcher 16 has a casing 21 with upper and lower ring members 22 and 23 secured therein. A flange 24, fastened to the upper ring member, is secured to the top deck 18 of the gun turret. Upper and lower ball bearings 25, 26, mounted, respectively, in the upper and lower ring members, receive a launching tube 27, having a central longitudinal axis A, for rotation in the casing on axis A.

A breech plate 28 is pivotally connected by pin 29 to the casing below the tube. The casing has a mounting block 30 secured thereto at the lower edge thereof with a headed stud 31 depending therefrom. The breech plate has an opening 22 into which the stud is received when the breech plate is swung to the closed position. The breech plate has a cavity 33 in which a pair of fingers 34 (see FIGURE 2) are pivotally mounted. The fingers 34 are urged by springs 35 under the head of stud 31 to secure the breech plate in the closed position. A handle 36 is secured to a pin 37 rotatably mounted in the breech plate and extending through cavity 33. The pin has a cam member 38 thereon which, when the handle is turned, spreads the fingers apart against the action of springs 35 to shift the fingers 34 from under the head of stud 31. When the fingers 34 slide out from under the head of stud 31, the breech plate can swing open.

The breech plate 28 has a bearing 39 therein (FIGURE 3) which receives a hub portion 40 of a base plate 41 for the launching tube. The bottom edge of the launching tube is slightly flared to tightly receive the tapered edge of the circular base plate 41 when the breech plate is swung closed. The base plate 41 is rotatable in the breech plate to rotate with the launching tube on vertical axis A inside the casing when the breech plate is closed. When the breech plate 28 is swung open, the base plate 41, which is mounted in the breech plate, swings out of the launching tube 27 to open the bottom of the launching tube for loading.

An electric motor 42 is mounted in the casing 21 and has a drive shaft 43 which is keyed to a circular plate 44. A ring 45 is secured in spaced relation to the plate 44 by means of screws 46 and spacers 47. A pinion 48, rotatably received on pin 49, is mounted between the plate 44 and the ring 45 for rotation relative thereto. The pinion 48 is in continuous engagement with a stationary gear 50 secured to the motor 42. A ring gear 51, mounted on the plate 44 and ring 45 by ball bearing 52, is in continuous engagement with pinion 48. A band 53 is received around the ring gear 50 and launching tube 27 to rotate the tube in accordance with rotation of the ring gear. The fixed gear 50, pinion 48, and ring gear 51 define an epicyclic gear train E which rotates, or spins, the launching tube on axis A at an angular speed several times greater than the angular speed of motor 42.

Alternatively, the launching tube 27 can be spun manually about the vertical central axis A through a gear box, indicated at 60, which is attached to casing 21. A handle 61 is secured to a gear 62 mounted in the gear box by ball bearing 63. The gear 62 is engaged with a gear 64 mounted on a stub shaft 65. The stub shaft 65, which is rotatably mounted in the gear box by bearings 66, has a second gear 67 secured thereon. Gear 67 is engaged with a gear 68 which is secured to motor drive shaft 43. The drive shaft 43 is rotatably received in gear 62 for rotation relative thereto. Thus, a soldier in the tank can rotate handle 61 to rotate motor shaft 43 through gears 62, 64, 67, 68 should the source of electric power fail. Rotation of the drive shaft 43 of electric motor 42, which is de-energized during manual operation of the launcher, will spin the launching tube through the epicyclic gear train E as previously described.

As shown best in FIGURE 3, a tube or casing 74 fits snugly but removably inside tube 27 for rotation therewith. A charge plate 75, which is secured in the bottom of the tube 74, has a stud 76 threadedly engaged at 77 therein. The stud extends through a cavity 78 which contains an explosive charge 79. The charge 79 is normally contained in cavity 78 by an annular diaphragm 80 which is recived on the stud and held thereon by nut 81. A firing pin 85 is received in a bore 86 extending through the hub portion 40 of base plate 41. A solenoid 87 is mounted to the bottom of hub portion 40 to drive the firing pin 85 upward into a primer 88 when solenoid button 89 is pushed. The firing pin is normally held in a retracted position by the spring 90 which is received in bore 86. The primer 88 is in a bore 91 in plate 75, and the bore 91 communicates by a cross passage 93 with cavity 78. The primer 88, charge 79, firing pin 85, solenoid 87, and button 89 comprise a propulsion unit P.

As shown best in FIGURE 3, a plurality of like projectiles 94, which are anti-personnel mines, are received in the tube 74. The mines, which are in the form of discs, are stacked one on the other, with the lowest mine resting on the plate 75. As shown best in FIGURE 22, each mine disc has a bore 95 near the edge extending therethrough in which a link pin 96 is tightly received to extend downwardly below the lower radial surface 94L of the disc. Each disc has in the upper radial surface of 94U a cavity in the form of a slot 97 intersecting the edge of the disc and extending radially inwardly from the edge a short distance. The slot 97 in each disc is diametrically opposite the pin 96 of that disc. The pin 96 of the bottom mine 94 extends into the slot 97 in plate 75. The pin 96 of each of the other discs extends downwardly into the slot 97 in the near (that is, upper) radial surface 94U of the mine disc immediately thereunder. Thus, all the discs 94 (eight in the embodiment of the invention shown in FIGURE 3) are coupled together at coupling points through the respective link pins 96 and slots 97 of the discs. Since the radial edge slot is open-ended, the coupling defined by the pin 96 and slot 97 is a releasable coupling because two adjacent discs can separate upon relative lateral movement. A cap 98 is received in the launching tube over the discs.

In operating the mechanism shown in FIGURE 3, eight munition discs 94 are stacked in a stack S with the depending pin 96 of each in the slot 97 of the disc thereunder, and the stack is placed in tube 74 with the depending pin of the bottom disc in the slot of plate 75. The handle 36 is turned to release the breech lock and to permit the breech plate 28, and base plate 41, to swing downwardly. The casing 74 is then loaded into the launching tube 27 and breech plate 28 is swung closed and locked. The motor 42 is then started to spin the launching tube 27 and tube 74 on axis A through the epicyclic gear train E. Button 89 is then depressed to fire solenoid 87. The energization of the solenoid snaps the firing pin 85 upwardly to explode primer 88 which ignites the main charge 79. The expansion of gas on the explosion of charge 79 ruptures disc 80 and propels the spinning stack of discs 94, which spin on a spin axis B through the center of the discs, out of the spinning concentric launching tube 74 and tube 27. The cap 98 is dislodged from the tube 74 as the stack of discs is propelled from the tube.

While the stack S of discs is in the tube 27, the discs are confined in the tube so that the geometrical center of each (that is, the center of a circle defined by the upper or lower surface of the disc) remains on the spin axis B, which is co-axial with the longitudinal central axis A of the launching tube.

As the stack S of discs 94 leaves the spinning tube 74 and is thereby released from the restrain of the tube for free flight (as indicated in phantom lines in FIGURE 1) the stack initially remains coupled together by pins 96 and slots 97 to spin, as a unitary system, about the spin axis B. Thereafter, the discs 94 separate and are hurled into a circular pattern around the tank as indicated by the scattered discs 94 of stack S shown in solid lines in FIGURE 1.

It is believed that if the center of gravity of every disc in a stack fell exactly on the axis about which the disc spun (that is, about the axis B through the geometrical center of the discs), the discs would remain coupled after emergence from the launcher and would continue to spin, as a unit, about a common axis until they fell to the ground. However, if the center of gravity of any one disc is off the spin axis (say, for example, 0.01 inch) the discs will fly apart after leaving the launcher. It should be noted that any disc constructed with a coupling pin angularly spaced from a coupling slot will have a center of gravity spaced from the geometrical center of the disc. In fact, any commercially manufactured disc, regardless of the design or position of coupling elements, will be sufficiently unbalanced to fly radially from a stack of like discs.

The action of the spinning discs after they are shot out of the spinning tube 74 into free flight can best be best understood by considering, initially, what happens when two releasably coupled spinning discs are propelled out of the launching tube. As shown in FIGURES 4, 5 and 6 the upper disc, which is referred to as 94a for convienience, has a bore 95a extending therethrough and has a pin 96a tightly received in the bore to extend downwardly below the lower surface of disc 94a. The pin 96a is received in the radial edge slot 97b in the upper surface of the lower disc which is referred to as 94b for convenience. Since there is no disc coupled to the upper surface of the upper disc, and no disc coupled to the lower surface of the lower disc, no radial edge slot in the supper surface of the upper disc and no pin depending from the lower surface of the lower disc is shown.

When the discs emerge from the spinning tube 74, disc 94a is spinning on spin axis B in the direction indicated by arrow 101a, disc 94b is spinning on spin axis B in the direction indicated by arrow 101b, and the system defined by discs 94a and 94b is spinning on spin axis B in the direction indicated by arrow 102.

Since the center of gravity CGa, CGb of each disc is not on the spin axis B, the discs tend to move outwardly from the spin axis by centrifugal force. Since the two discs are coupled together, they react on each other to move in opposite directional senses, as shown in FIGURE 5. The system continues to rotate in the same direction as originally, as indicated by arrow 102, about the same spin axis B. Axis B, however, no longer passes through the geometrical center of each disc. In addition to the spin of the system about axis B, each disc begins to rotate, or spin, relative to the other disc, about the coupling axis D defined by the pin 96a which links the discs together. The relative rotation of disc 94a with respect to disc 94b about axis D occurs in the angular directional sense indicated by arrow 103ab; the relative rotation of disc 94b with respect to disc 94a about axis D occurs in the angular directional sense indicated by arrow 103ba. Thus, as the discs separate, the spin axis of each individual disc is momentarily transferred from the geometrical center of the disc (which fell on axis B as the discs left the tube) to the coupling axis D. For this reason, I refer to my apparatus for dispersing the discs as spin axis transfer apparatus.

The relative separating rotation between the discs continues until the discs have swung about axis D to relative positions where the pin 96a pulls out of the slot 97b as a result of the momentum generated by the whip of the discs about the coupling axis D. This momentum propels the two discs in opposite directional senses, as indicated by arrows 104a, 104b, after the discs separate, as shown in FIGURE 6. At the instant of separation, each disc, which is a flat, or planar, projectile, resumes spinning about an axis CGa, CGb, respectively through its center of gravity, as indicated by arrows 101a and 101b.

Thus, each disc, before release from the tube, develops angular momentum which, after release, tends to make the discs spin about their own centers of gravity. As the centers of gravity separate, however, the coupling prevents this independent spinning about the two separating axes. Thus, the angular momentum of each disc acts through leverage arm La, Lb, extending from the center of gravity of the discs to the coupling axis, to push the discs apart.

A system comprising a stack of three discs 94c, 94d, 94e is shown in FIGURES 7, 8, 9 and 10. The top disc 94c has a bore 95c with a depending pin 96c tightly received therein. Pin 96c is received in a radial edge slot 97d in the upper surface of the middle discs 94d to define a coupling axis Gcd between discs 94c and 94d. The middle disc has a bore with a depending pin 96d received therein. The 96d is received in a radial edge slot 97e in the upper surface of the bottom disc 94e to define a coupling axis Gde between the discs 94d and 94e.

As shown in FIGURE 7, each disc, which has a center of gravity CGc, CGd and CGe spaced slightly from its geometrical center, is spinning about its geometrical center as the discs leave the launcher 16, as indicated by arrows 110c, 110d and 110e. As the discs leave the tube 74, the system as a unit is spinning, as indicated by arrow 111, about the spin axis F which passes through the geometrical center of each disc (that is, the center of the circle defined by the upper and lower radial surfaces 94U and 94L, FIGURE 3, of the discs).

After the discs clear the launching tube, the system continues to spin about axis F, as indicated by arrow 111, but the individual discs begin to rotate, or spin, relative to each other about the two coupling axes Gcd and Gde, as shown in FIGURE 8. Initially, the top disc 94c begins to spin about axis Gcd relative to the middle disc 94d as indicated by arrow 112cd. Shortly thereafter, the bottom disc 94e begins to spin about axis Gde relative to the middle disc 94d as indicated by arrow 112ed. As shown in FIGURE 9, the top disc separates from the middle disc before the bottom disc which as shown in FIGURE 10, separates from the middle disc shortly thereafter. As each disc separates from the middle disc, each rotates about its own center of gravity CGc and CGe, respectively, as indicated by arrows 114c and 114e. After the bottom disc has separated from the middle disc, the middle disc also rotates about its own center of gravity CGd, as indicated by arrows 114d.

Thus, as long as the discs are contained in a stack, as by tube 74, the discs spin in unison about a common axis through their geometrical centers. When the discs are released from confinement into free flight and are unrestrained except for the releasable coupling which links each disc to the contacting disc or discs, centrifugal force tends to separate the discs. The tendency of the discs to spin about their own center of gravity (that is, the angular momentum of the individual discs) generates a force in each discs which, by virtue of the leverage with which the force is transmitted through the couplings to an adjacent disc or discs, violently throws the discs apart.

In an actual test using aluminum discs 4.6 inches in diameter and weighing 1.5 pounds, the discs were spun at 800 r.p.m. in the launching tube and were ejected from the tube at a rate of 26 feet per second. Each of the ten discs in the stack had a pin and an open-ended radial edge slot 180 degrees apart, and each had a center of gravity about 0.008 inch from the geometrical center of the disc. Nine of the ten discs fell close to a circle of twenty foot radius with the center of the circle at the launching apparatus which was operated in a fixed position. The fact that the discs spun, after separation, about their centers of gravity which were spaced from the geometric centers of the discs did not materially affect the flight of the discs because the distance between the center of gravity and the geometric center of each disc was small. The tenth disc fell close to the launching apparatus. From numerous other tests and a theoretical analysis, the following conclusions have been reached:

(1) With a stack of two discs, the discs are hurled in directional senses 180 degrees apart.

(2) With a stack of two discs of equal mass, the discs are hurled equal distances; two discs of unequal mass are hurled distances inversely proportional to their masses.

(3) The angular relationship of coupling axes in a stack of three or more discs is not critical; the coupling axes may be coaxial, 180 degrees apart, or anywhere between.

(4) The coupling edge slots can be radial or sloping with respect to a radius.

(5) The position of the center of gravity of the discs with respect to the geometrical center of the discs and the axis or axes by which the disc is coupled to adjacent disc or discs is not critical.

(6) Only one disc in a stack of coupled discs need be unbalanced, that is, having a center of gravity spaced from the geometrical center of the disc.

(7) The greater the unbalance in the discs, the faster the discs will separate after being propelled into free flight.

(8) The distance a disc is hurled is proportional to the distance between the center of the disc and the coupling axis and proportional to the extent of the relative angular rotation with respect to coupled discs before separation.

(9) With a coupling system comprising a pin and slot, the pin can be extending from the lower or upper surface of the disc, although a pin extending from the lower surface tends to remain coupled longer, resulting in a greater radius of dispersion.

(10) The greater the spin rate of the tube, the greater the distance the discs are hurled.

There is shown in FIGURE 11 a launcher 120, mounted inside a vehicle V. Launcher 120 is identical in all respects, except as set forth below, to the launcher 16 shown in FIGURES 2 and 3. For convenience, the same part numbers will be used in referring to parts of launcher 120 which are identical to the corresponding parts of launcher 16. Instead of a propulsion unit comprising a charge, firing pin, and solenoid to propel the discs from the launching tube, the launcher 120 has a screw 121 threadedly received in a nut 122 secured to the outer surface of breech plate 28. A handle 123 is secured to the lower end of the screw which extends upwardly through a central bore 124 in the hub 125 of base plate 126 and through a central bore 119 in plate 118 at the bottom of tube 134. A pad 127 is rotatably mounted on the upper end of the screw and engages a pusher plate 117 which is keyed at 116 in a vertical slot 115 in the tube. A stack of discs 294 are coupled together by pins 296 and edge slots 297 as the stack S of discs 94 except that the pins 296 extend upwardly from the upper surface of each disc for receipt into the slots 297 which are in the lower surface of the discs. The bottom disc 294 of the stack of discs, which is received in the tube 134 of the launcher 120, is releasably coupled to the pusher plate 117. Plate 117 has a pin 296 extending upwardly into the slot 297 of the lower disc. An annular fence 128 is mounted on the flange 24 at the upper end of casing 21. The fence 128, which is in registration with tube 134, has a lower circular flange 129 which seats on the upper surface of flange 24 inside an opening O in the vehicle in which the launcher is mounted. A circular band 130, secured to the upper surface of flange 24, has an inner portion overlying flange 129 of fence 128 to hold the fence in registration with tube 134 but to permit manual rotation of the fence on flange 24. One portion 131 of the fence, extending 180 degrees around the fence, is much higher than the remaining half of the fence to define a backing plate. The lower portion 132 of the fence thus defines an opening 133 opposite the backing plate for the passage of discs.

In operation of the launcher shown in FIGURE 11, the screw 121 is lowered until the pad 127 is withdrawn into bore 119 of plate 118. The breech plate 28 is then opened and plate 117 removed from tube 134. The discs are stacked on plate 117 with the discs coupled to adjacent discs and the bottom disc coupled to the plate 117. The tube 134 is then loaded with discs 94 and plate 117, and the breech plate is closed and locked. The fence 128 is then manually rotated until the opening 133 is facing the direction in which it is desired to hurl the discs. The electric motor 42 is then started to spin tube 134 through the epicyclic gear train (not shown) and drive band 53. After the tube and discs therein are spinning, the handle 123 is rotated to elevate pad 127 and raise the stack of discs. As soon as the top disc clears the lower portion 132 of the fence, the disc, which spins about its geometrical center on spin axis B while confined by tube 134, spins about pin 296 of the underlying disc when released from confinement. After partial rotation about the coupling axis defined by the pin of the underlying disc, the disc hurtles outwardly from the launcher through the opening 133. Successive discs are launched in the same direction (unless the fence is rotated) as the pad 127 is raised by handle 123.

Some parts of the launcher 140, shown in FIGURES 12 and 13 as mounted in the turret 10 of tank 15, are identical to corresponding parts on the launcher 16, and the same reference numerals are used to identify these identical parts. Launcher 140 has a casing 141 having a flange 24. A tube 142 is tightly received in casing 141. A base plate 143 is tightly mounted in a breech plate 139 which is pivotally connected at 144 to the casing 141. The breech plate 139 can be released and locked in the same manner as the breech plate 28 in launcher 16. A solenoid 87, having a firing button 89, is connected to the breech plate. A removable charge plate 75 is received in the bottom of tube 142, and a plurality of discs 145 (indicated in phantom lines in FIGURE 12) each has a coupling pin and slot similar to the pins and slots 96, 97 of discs 94 except that the bottom disc has no depending pin. As shown best in FIGURE 12, the inner surface of tube 142 has spiral rifling consisting of four grooves 146. The discs 145 each have four ears 147 on the periphery which are received in the grooves 146. A firing pin 85 is received in base plate 143 and is elevated by operation of solenoid 87. Explosive mechanism identical to that described in launcher 16 is contained in charge plate 75 for detonation when the firing pin 85 is raised.

To load the launcher, breech plate 139 and base plate 143 are swung down, and charge plate 75 is removed. The ears 147 on the discs will lie in spiral paths around the stack when the discs are coupled together. The stack of discs is then screwed into the tube 142, the plate 75 is replaced in the tube, and the breech plate is swung closed and locked.

When the discs 145 are loaded in tube 142, and the main charge is ignited, the discs 145, which are releasably coupled together by pins extending from each disc into the slot in the disc below, are forced upward in the tube by the expanding gas of the ignited charge. As the discs move upward in unison, a spin is imparted to the stack by the rifling in the tube and the ears on the discs. As the discs leave the confinement of the tube, they are dispersed by a transfer of the spin axis in the same manner as discs propelled from the launcher 16.

As shown in FIGURE 14, a different embodiment of a spin axis transfer launcher 150 is mounted in a helicopter 151 to disperse discs 152 which may, for example, be mines or other munitions. As shown in FIGURE 15, the launcher 150 has an outer cylindrical casing 153 which is mounted over an opening 154 in the bottom of the helicopter 151. A collar 155 secured to the bottom of the casing has a lower flange 156 which is secured to the helicopter. An axle 160 has an upper hub portion 161 which is threadedly received in a boss 162 at the top of the casing. A threaded bore 163 in the upper surface of the hub portion 161 receives a nut 164.

An annular base plate, or sabot, 165 is mounted on the axle 160 by means of a ball bearing 166. The outer race 167 of bearing 166 is held securely in the sabot by top plate 168 of the sabot. The inner race 169 of the bearing is mounted snugly on the axle but, under a downward acting force, will slide down the axle. A tube 170, loosely received over the axle, is threadedly received in the base sabot below bearing 166. The lower end of tube 170 is snugly but slidably received over the outer race 171 of a ball bearing 172, the inner race 173 of which is tightly mounted on a reduced diameter end portion 174 of axle 160.

An annular jet spinner motor 180 is received over the lower end of tube 170 and is threadedly engaged therewith. The motor 180 comprises a cap member 181 which is threadedly engaged with a body member 182. The cap and body member together define a cavity 183 therein. Cavity 183 contains a lower layer of a primer, or first fire, charge 184 and a propellent charge 185. As shown best in FIGURES 15 and 16, two jet exhaust chambers 186, 187 one on each side of axle 160, slope in opposite directions and terminate in ports 188, 189 (see FIGURE 18) in the bottom of body member 182. Chambers 186, 187 are each connected to cavity 183 by passages 190, each of which contains a propellent initiator, or cap, 191.

A plurality of the annular discs 152 are received on the tube 170 between the sabot 165 and the propellent motor 180. Each disc has an open-ended radial edge slot 192 in its upper surface and a pin 193 extending from its lower surface. In addition, the sabot has a pin 193 extending downwardly therefrom and the cap member 181 of the propellent motor 180 has a slot 192 in its upper surface. The pin of the sabot and each disc is received in the slot of the member immediately thereunder, and thus, the sabot 165, discs 152, and propellent motor 180 are all releasably coupled together by pins 193 and slots 192.

As shown best in FIGURE 17, four bores 194 equally angularly spaced around the central axis K of the axle and parallel thereto, each receive therein a cap 195, a first fire charge 196, a delay charge 197, and a main charge 198. Each of the bores 194 is connected by passage 199 to the interior of casing 153. A central passage 200 on axis K extends through the axle and contains a wire 202. Wire 202 is connected to two lead wires 203 which are connected to caps 191. The nut 164 has a central passage 205 through which wire 202 passes for connection to a source of energy (not shown) through a switch (not shown). Passage 205 has four lateral branch passages 208 communicating with bores 194 and four lead wires 210 received in passages 208 are connected between wire 202 and caps 195.

In operation of the spin axis transfer launching mechanism 150, the switch is closed to send a signal simultaneously to the four caps 195 and the two caps 191. The detonation of caps 195 immediately ignites primer charges 196 and the detonation of caps 191 immediately ignites primer charge 184. Primer charge 196 ignites the slow burning delay charge 197 and primer charge 184 ignites the main motor propellent charge 185. On the ignition of charge 185, gas is expelled through sloping chambers 186 to blow off removable cap 211 as shown in FIGURE 18. The gas escapes through ports 188, 189 to create a torque which spins the motor 180. As motor 180 spins, the tube 170 connected thereto spins to spin the sabot 165 which is connected to the motor by tube 170. Thus, the discs 152, which are coupled together and coupled to the motor and the sabot, also commence to spin with the motor.

After the motor 180 gets the discs spinning, the delay charge 197 ignites the main charge 198. The expanding gas from the ignition passes through passages 199 to the upper surface of the sabot 165. The gas is prevented from escaping around the sabot by the flexible sealing ring 212. The gas therefore forces downwardly on the axle 160 the entire assembly comprising sabot 165, bearing 166, discs 152, tube 170, and motor 180 as shown in FIGURE 19. This assembly passes out of the casing 153 and continues descending until the upper bearing 166 abuts against and is stopped by the lower bearing 172. When the upper bearing 166 is stopped by the lower bearing 172, the tube 170 is arrested and the inertia of the motor and discs causes the tube to snap, at a point indicated by numeral 213, as shown in FIGURE 20. When the tube snaps, the motor and discs leave the tube in free flight as shown in FIGURE 21. These members, releasably coupled together by the pins 193 and slots 192, initially spin about an axis through their geometrical center. Since at least some of the discs have their center of gravity spaced slightly from their geometrical center, they rotate about the coupling pins and fly outwardly to disperse.

There is shown in FIGURES 23 and 24, a launcher 225 which is identical in many respects to the launcher 140 of FIGURES 12 and 13. For convenience, parts on launcher 225 identical to parts on launcher 140 are identified with similar numbers. The launcher 225 has a tube 226 corresponding to tube 142 of launcher 140 except that tube 226 has no rifling cut therein. A removable charge plate 75 has a propulsion unit P therein identical to the propulsion unit shown in launcher 16 in FIGURE 3. In the embodiment of FIGURES 23 and 24, a stud 227, corresponding to the stud 76 of launcher 16, extends above the upper surface of the charge plate 75 and is threadedly received in the lower end of an upstanding axle 228. The lower end of axle 228 serves to hold diaphragm 80 in position over the charge 79. A plurality of discs 230 each having a central opening 231 therethrough, are received on axle 228 and coupled together by pins and slots (not shown) in the same manner as the discs of FIGURE 3.

The axle 228 has three spiral grooves 232 cut therein, and the discs each have three ears 223 extending into the central opening 231. When the discs are stacked and coupled together, the ears will lie in three spiral paths corresponding to the three spiral grooves on the axle.

After the charge plate 75 and axle 228 are removed from the launcher when the breech plate 139 is swung open, the coupled discs are screwed on the axle until the bottom disc, which has no depending coupling pin, rests on charge plate 75. Thereafter the plate 75 and discs 230 are loaded into tube 226. The breech plate and base plate are then swung up and the breech plate locked.

When button 89 is pressed to energize solenoid 87 to raise pin 85, the charge in charge plate 75 is ignited as described in conjunction with launcher 16. The expanding gas in tube 226 propels the coupled discs out the tube, and the rifling on the axle imparts a spin to the coupled discs as they leave the tube.

Although the best mode contemplated for carrying out the present invention has been herein shown and described, it will be apparent that modification and variation may be made without departing from what is regarded to be the subject matter of the invention as set forth in the appended claims. For example, ordnance projectile bodies have been shown and described to illustrate the novel projection and dispersion of bodies according to the invention, and it will be understood that the term "projectile" as used in the claims includes not only ordnance projectile bodies but any bodies similarly projected and dispersed.

Having completed a detailed description of the invention so that those skilled in the art could practice the same, I claim:

1. Dispersal apparatus comprising
    (a) a plurality of discs stacked on a common axis, at least some of said discs having a pin and at least some of said discs having a slot intersecting the edge of the disc, at least one of said discs having a center of gravity spaced from said common axis, each of said discs coupled to an adjacent disc by a pin and slot on a coupling axis parallel to and spaced from said common axis,
    (b) means to spin said stacked discs about said common axis,
    (c) means initially to restrain said discs from lateral movement with respect to said common axis and from relative rotation between coupled discs about their coupling axis, and
    (d) means to release said stack of spinning discs from said restraint to permit relative rotation between coupled discs about their coupling axis for separation of the discs and for independent spinning thereof about their own axes in free flight.

2. Dispersal apparatus comprising
    (a) a plurality of planar projectiles stacked on a common axis, at least one of said projectiles having a center of gravity spaced from said common axis,
    (b) means releasably coupling said projectiles to adjacent projectiles on coupling axes parallel to and spaced from said common axis,
    (c) means to spin said stacked projectiles about said common axis,
    (d) means initially to restrain said projectiles from lateral movement with respect to said common axis and to restrain projectiles from relative rotation about said coupling axes, and
    (e) means to release said stack of spinning projectiles from said restraint to permit relative rotation between projectiles about coupling axes for lateral separation of the projectiles and for independent spinning thereof about their own axes in gyroscopically stable free flight.

3. Dispersal apparatus comprising
    (a) a disc,
    (b) a member to receive the disc, said member rotatable about a spin axis passing through the disc and spaced from the center of gravity of the disc,
    (c) means to releasably couple the disc to said member on a coupling axis parallel to and spaced from said spin axis,
    (d) means to rotate said member and disc about said spin axis without relative rotation therebetween,
    (e) means initially to restrain said disc from lateral movement with respect to said spin axis and to restrain said disc from rotation about said coupling axis, and
    (f) means to release said disc from said restraint to permit rotation of said disc about said coupling axis for lateral separation of the disc from said member and for independent spinning of the disc about its own axis in gyroscopically stable free flight.

4. The apparatus of claim 2 in which the means initially to restrain said projectiles from lateral movement with respect to said common axis and to restrain projectiles from relative rotation about said coupling axes comprises a tube in which the projectiles are stacked.

5. The apparatus of claim 4 in which the means to release said stack of spinning projectiles from said restraint comprises means to eject the stacked projectiles from the tube.

6. The apparatus of claim 5 in which the tube is rotatable about the common axis of the projectiles and in which the means to spin said stacked projectiles about said common axis comprises means to spin said tube.

7. The apparatus of claim 6 in which the means to eject the stacked projectiles from the tube is an explosive charge.

8. The apparatus of claim 4 in which the means to spin said stacked projectiles about said common axis comprises a jet spinner motor coupled to said stacked projectiles.

9. The apparatus of claim 5 in which the means to spin said stacked projectiles about said common axis comprises rifling on the interior surface of said tube.

10. The apparatus of claim 3 in which the means initially to restrain said disc from lateral movement with respect to said spin axis and to restrain said disc from rotation about said coupling axis comprises a tube in which the disc and said member are received and in which the means to rotate said member and disc comprises means to spin the tube.

11. The apparatus of claim 10 including means to eject the discs from said tube one at a time.

12. The apparatus of claim 11 including means defining a side opening at the mouth of the tube for release of the disc in a desired direction.

13. The apparatus of claim 2 in which the means releasably coupling said projectiles to adjacent projectiles on coupling axes parallel to and spaced from said common axis includes a cavity in some of the projectiles and a pin extending from some of the projectiles for receipt into the cavity of an adjacent projectile.

14. The apparatus of claim 2 in which the means initially to restrain said projectiles from lateral movement with respect to said common axis and to restrain projectiles from relative rotation about said coupling axes comprises an axle extending through the projectiles.

15. The apparatus of claim 14 in which the means to release said stack of spinning projectiles from said restraint comprises an explosive charge to separate the projectiles from the axle.

16. The apparatus of claim 15 in which the means to spin said stacked projectiles about said common axis includes a spiral groove on the axle.

17. The apparatus of claim 15 in which the means to spin said stacked projectiles about said common axis comprises a jet spinner motor coupled to the stacked projectiles.

18. The apparatus of claim 1 in which the discs are of like size and shape and said common axis passes through the geometrical center of the discs and in which the means initially to restrain said discs from lateral movement with respect to said common axis and from relative rotation between coupled discs about their coupling axis comprises a tube to receive the stacked discs with the common axis thereof on the central axis of the tube.

19. The apparatus of claim 18 in which the means to release said stack of spinning discs from said restraint comprises an explosive charge to eject the discs from said tube.

20. The apparatus of claim 19 in which the tube is rotatable about said common axis and in which the means to spin the stacked discs about said common axis comprises a motor operatively connected to the tube for rotation thereof.

21. The apparatus of claim 19 in which the means to spin said stacked discs about said common axis comprises rifling on the inner surface of said tube.

22. The apparatus of claim 1 in which the means to spin said stacked discs about said common axis comprises a jet spinner motor coupled to the stack of discs.

23. The apparatus of claim 1 in which the discs are annular and in which the means initially to restrain said discs from lateral movement with respect to said common axis and from relative rotation between coupled discs about their coupling axis comprises an axle extending through the discs.

24. The apparatus of claim 23 in which the means to release said stack of spinning discs from said restraint comprises an explosive charge to separate the discs from the axle.

25. The apparatus of claim 24 in which the means to spin said stacked discs about said common axis includes a spiral groove on the axle.

26. The apparatus of claim 18 in which the means to spin said stacked discs about said common axis comprises a motor operatively connected to the tube and in which the means to release said stack of spinning discs from said restraint comprises a pusher member to push the discs one at a time out of the end of the tube.

27. The apparatus of claim 26 including an angularly adjustable fence with an opening therein at the end of the tube to direct the discs in a selected direction.

28. The apparatus of claim 2 in which said planar projectiles are munitions.

References Cited

UNITED STATES PATENTS

| | | | |
|---|---|---|---|
| 533,572 | 2/1895 | Unge | 89—1 |
| 2,742,889 | 4/1956 | Clauss | 102—56 X |
| 2,897,757 | 8/1959 | Kulluck | 102—38 |

SAMUEL W. ENGLE, Primary Examiner

U.S. Cl. X.R.

102—38; 124—42

UNITED STATES PATENT OFFICE
CERTIFICATE OF CORRECTION

Patent No. 3,500,714    Dated March 17, 1970

Inventor(s) JAMES F. CULLINANE

It is certified that error appears in the above-identified patent and that said Letters Patent are hereby corrected as shown below:

Column 3, line 60, change "22" to -- 32 --. Column 4, line 18, change "bearing" to -- bearings --. Column 4, line 50, change "recived" to -- received --. Column 4, line 69, after "surface" delete "of". Column 5, line 39, change "restrain" to -- restraint --. Column 5, line 65, before "understood" delete "best". Column 5, line 69, change "convienience" to -- convenience --. Column 6, line 2, change "supper" to -- upper --. Column 6, line 60, after "The" insert -- pin --. Column 7, line 25, change "discs" to -- disc --. Column 8, line 70, change "10" to -- 19 --.

Signed and sealed this 21st day of September 1971.

(SEAL)
Attest:

EDWARD M. FLETCHER, JR.
Attesting Officer

ROBERT GOTTSCHALK
Acting Commissioner of Patents